May 21, 1940.  A. J. SCHOENHEIT  2,201,377
VISOR
Filed April 24, 1939
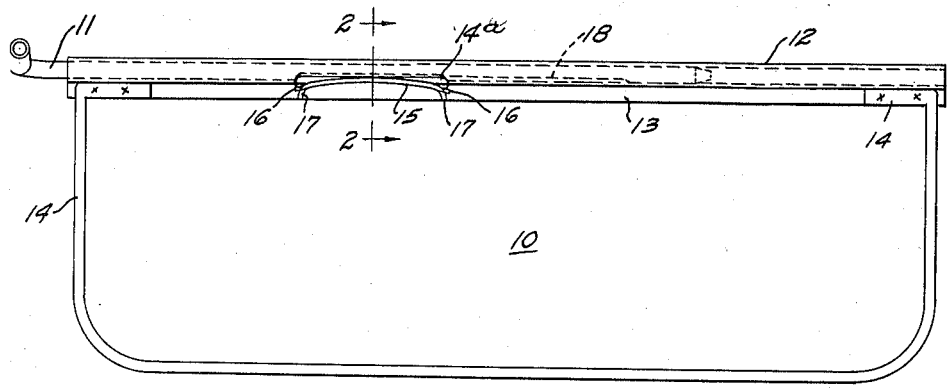
Fig. 1
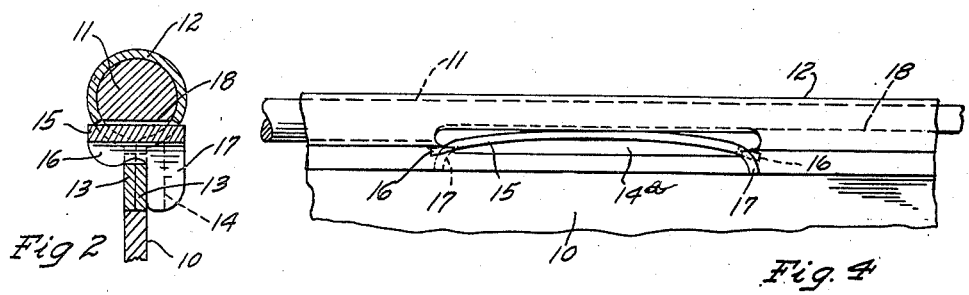
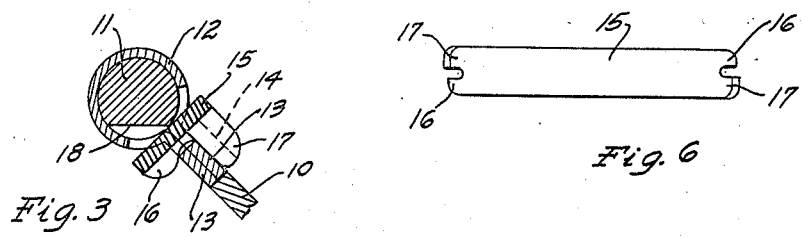
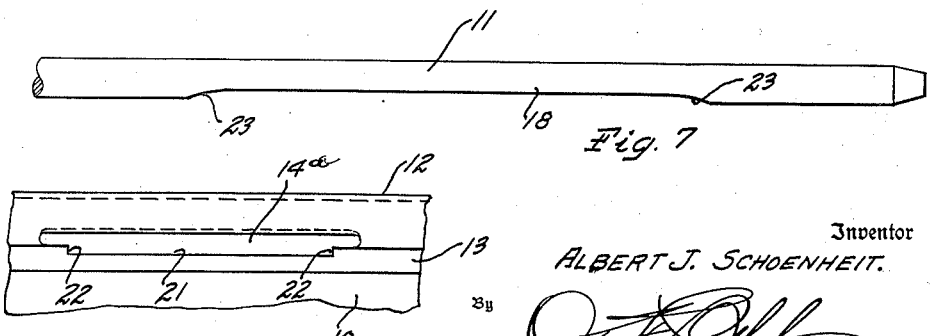
Inventor
ALBERT J. SCHOENHEIT.
By
Attorney Patented May 21, 1940

2,201,377

UNITED STATES PATENT OFFICE 2,201,377

VISOR

Albert J. Schoenheit, Detroit, Mich., assignor, by mesne assignments, to Reconstruction Finance Corporation, Detroit, Mich., a corporation of United States Application April 24, 1939, Serial No. 269,669

8 Claims. (Cl. 296—97)

This invention relates generally to visors or glare shields for motor vehicles and more particularly to adjustably supported visors or glare shields.

It is an object of the present invention to provide for motor vehicles a new and improved glare shield having an axis with respect to which the position of the shield may be adjusted both radially and longitudinally.

Another object of the invention is to provide a new and improved glare shield which may be shifted along a supporting shaft thereof to any desired position and which may be readily and frictionally held in desired positions.

A further object of the invention is to provide a glare shield having the above mentioned adjustment characteristics and one which is inexpensive and easy to manufacture.

Other objects of the invention will become apparent from the following description taken in connection with the accompanying drawing in which—

Figure 1 is a view shown in elevation of a glare shield embodying features of my invention;

Fig. 2 is a view in cross section of the glare shield, taken along the line 2—2 of Fig. 1;

Fig. 3 is a view similar to Fig. 2, showing the shield in a different position of adjustment;

Fig. 4 is an enlarged fragmentary view in elevation of the shield;

Fig. 5 is an enlarged fragmentary view in elevation of the shield;

Fig. 6 is a view in elevation of a spring member employed with the present shield, and Fig. 7 is a view of a shaft used with the shield.

Referring to the drawing by characters of reference, a visor or glare shield 10 is adjustably supported on a shaft or rod 11 which may be mounted by any suitable means to extend horizontally above the windshield of a motor vehicle. The glare shield 10 may be of general rectangular shape and is provided with a tube portion 12 which is secured to and extends along one, or the top longitudinal edge of the shield, this tube portion 12 of the glare shield 10, freely receiving the shield supporting rod 10, such that the position of the shield may be adjusted radially or about the longitudinal axis of the rod and also such that the position of the shield may be adjusted along its rod. Preferably, the shield tube portion 12 is formed of a strip of sheet metal, longitudinal border portions of which are bent down as flanges 13 and welded together and the frame of the glare shield, as at 14, may be welded or may be otherwise suitably secured to the tube flanges 13.

Intermediate its ends, the shield tube portion 12 is provided with an elongated opening 14a therethrough which extends longitudinally of the tube and extends partly into and through both of the depending tube flanges 13. Loosely carried by the shield tube portion 12 and positioned in the opening 14, a leaf spring member 15 is provided and is adapted to be tensioned to hold the shield in various positions of adjustment. The spring member 15 may be made of spring, tempered steel and is bent or bowed longitudinally thereof having a crown portion extending upwardly into the tube 12 to engage the rod 11. At its opposite ends, the spring member 15 is bifurcated, providing ears 16 and 17, spaced apart such that they may straddle the double thickness of metal or abutting flanges 13, thus inexpensively retaining the spring member 15 in place. Of the pairs of ears, the opposite ears 17 are bent down to engage sides of the abutting flanges 13 so that the spring member 15 will not move out of, or be dislodged from, the opening 14, upon movement of the shield 10 in opposite directions about the longitudinal axis of the rod 11.

As shown in Fig. 2, the shield supporting rod 10 is provided with cam means inexpensively obtained by a recess or flattened portion 18 on the rod which permits the spring member 15 to extend partly into the tube portion 12 when the visor 10 is in position, with its opening 14 immediately below the rod flattened portion 18. In this position, the convex surface of the spring member 15 abuts the downwardly facing edges of the opening 14 as a stop, which space the spring member 15 from the flattened shaft portion 18 such that the shield may be easily slid along its rod. As is more clearly shown in Fig. 5, the upper edges of the flanges 13, forming the opening 14, are recessed, as at 21, which recess terminates adjacent the opposite ends of the opening 14 providing opposed abutments 22 against which the opposite bifurcated ends or sockets of the spring member 15 are adapted to seat when the shield 10 is moved about its axis such that the crown of the spring member 15 rides onto the cylindrical surface of its supporting rod 11. As shown in Fig. 7, the elongated flattened portion 18 of the rod 11 terminates at its opposite ends, intermediate the ends of the rod, providing stops 23 to limit sliding movement of the shield in opposite directions.

From the foregoing description, it will be seen that with the shield 10 in the position shown in Fig. 2 with the spring member 15 opposite the rod flattened portion 18 that the spring tension is released so that the shield 10 may be easily slid along its rod 11 to any desired position, limited by the stops 23. After the shield has been adjusted to the desired position along its rod 11, the shield may then be tilted or moved radially about the axis of its rod whereby the crown of the spring member 15 rides on the cylindrical surface of the rod 11, thus tensioning the spring with corresponding frictional holding force between the spring and rod. When the crown of the spring rides on the cylindrical surface of the rod, the resultant cam action in tensioning the spring 15 slightly elongates the same until the opposite end sockets of the spring seat against their respective abutments 22. The flexing movement necessary to seat the opposite ends of the spring 15 against their abutments 22 is less than the radial distance between the flattened rod surface 18 and the rod cylindrical surface with the result that when the spring 15 rides onto the rod cylindrical surface the spring tends to buckle slightly thus obtaining a frictional force between the spring and rod which will hold the shield in adjusted positions.

From the foregoing description, it will now be seen that I have provided a new and improved glare shield for motor vehicles and one which may be adjusted both longitudinally and radially with respect to its supporting rod. It will further be seen that I have provided a glare shield of this character in which the spring member is loosely carried by the shield member to obtain greater holding friction betwen said spring member and the shield supporting rod in adjusted positions of the shield and this loose arrangement of the spring also renders the structure inexpensive as it eliminates welding or securing by other means of the spring to the shield.

While I have shown and described my invention in detail it is to be understood that the same is to be limited only by the appended claims for many changes may be made without departing from the spirit and scope of the invention.

What I claim is:

1. A glare shield comprising a support, a shield member pivoted on said support and arranged for moveable adjustment longitudinally of the axis of the pivot, and means engageable with said support and with said shield member for yieldingly holding the shield member in adjusted positions, and means cooperable with said last named means upon movement of said shield member about the pivot to one positon to release the holding means.

2. A glare shield comprising, a support, a shield member pivoted to said suport and movable relative thereto for adjustment of its position longitudinally of the axis of the pivot, and a bowed leaf spring having a crown engageable with said support and tensioned by movement of said shield member about the axis of the pivot to hold the shield member in adjusted positions and means on said support for releasing the tension of the said leaf spring upon movement of said shield member to one position.

3. A glare shield comprising, a shaft, a shield member mounted on and movable about the longitudinal axis of the shaft, said shield member also being movable along the shaft, and means carried by said shield member and engageable with the periphery of said shaft to hold said shield member by friction against movement and effected by movement of said shield member about the longitudinal axis of said shaft and means on said support for decreasing said friction upon movement of said shield member to one position.

4. A glare shield comprising, a shaft, a shield member having a tubular portion receiving said shaft, said shield member being movable about the longitudinal axis of said shaft and also being movable along the shaft, said tubular portion having an opening therethrough intermediate its ends, and a spring member positioned in said opening and tensioned by said shaft upon movement of said shield member about its said axis to hold said shield member in adjusted positions, said shield member being movable about said axis to a position to release said spring member.

5. A glare shield comprising, a shaft, a shield member having a tubular portion receiving said shaft, said shield member being movable about the longitudinal axis of said shaft and also being movable along said shaft, a spring member carried by said tubular portion and tensioned by said shaft upon movement of said shield member about the axis of said shaft to hold the shield member in positions of adjustment, said shaft having a recess to receive said spring member to release the tension thereof so that the shield member can be moved along the shaft.

6. A glare shield comprising, a shaft having a flattened portion, a shield member having a tubular portion receiving said shaft, said shield member being movable about the longitudinal axis of said shaft and also being movable along said shaft, said tubular portion having an opening intermediate its ends, a bowed leaf spring member carried by said tubular portion and extending thereinto through said opening having a crown portion engaging the periphery of said shaft, said spring member being tensioned by engagement with the cylindrical surface of said shaft to hold the shield member frictionally against movement relative to said shaft said spring member having its tension decreased upon positioning of said crown portion over said shaft flattened portion.

7. In a glare shield, a supporting rod, a shield member having a tubular portion receiving said rod and having an opening, said shield member being movable about the longitudinal axis of said rod and also being movable along the rod, a resilient member loosely carried by said shield member and positioned in said opening to engage said rod, and cam means on said rod for tensioning said resilient member upon movement of said shield member about said rod to hold said shield member by friction to said rod.

8. In a glare shield, a supporting rod, a shield member having a tubular portion to receive said rod, said shield member being movable about the longitudinal axis of said rod and also being movable along the rod to various positions of adjustment, said tubular portion having an opening thereinto and having spaced opposed abutments, a bowed leaf spring arranged loosely in said opening to engage said rod and hold said shield frictionally thereto, said spring at its opposite ends having recesses to engage in respective abutments upon predetermined tensioning of said spring, and cam means on said rod operable to tension said leaf spring upon movement of said shield member about the longitudinal axis of said rod.

ALBERT J. SCHOENHEIT.